(12) United States Patent
Kojima et al.

(10) Patent No.: US 7,218,373 B2
(45) Date of Patent: *May 15, 2007

(54) ELECTRO-OPTICAL DEVICE ENCASED IN MOUNTING CASE, PROJECTION DISPLAY APPARATUS, AND MOUNTING CASE

(75) Inventors: Hiroyuki Kojima, Suwa (JP); Hiromi Saitoh, Chino (JP); Tomoaki Miyashita, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 409 days.

This patent is subject to a terminal disclaimer.

(21) Appl. No.: 10/825,325

(22) Filed: Apr. 16, 2004

(65) Prior Publication Data

US 2004/0246398 A1    Dec. 9, 2004

(30) Foreign Application Priority Data

Apr. 22, 2003    (JP) .............................. 2003-117168

(51) Int. Cl.
*G02F 1/1333* (2006.01)

(52) U.S. Cl. ........................................ 349/161; 349/58

(58) Field of Classification Search ............ 349/58–60, 349/161
See application file for complete search history.

(56) References Cited

U.S. PATENT DOCUMENTS 6,950,308 B2 *    9/2005    Saitoh et al. ................ 361/704

2002/0167637 A1    11/2002    Burke et al.

FOREIGN PATENT DOCUMENTS

| JP | A 03-149521 | 6/1991 |
| JP | A 04-125538 | 4/1992 |
| JP | A 06-067143 | 3/1994 |
| JP | 06-055134 U | 7/1994 |
| JP | A 06-265855 | 9/1994 |
| JP | A 07-248480 | 9/1995 |
| JP | A1 WO 98/36313 | 8/1998 |
| JP | A 10-232629 | 9/1998 |
| JP | A 2000-147472 | 5/2000 |
| JP | A 2002-107698 | 4/2002 |
| JP | A 2002-296568 | 10/2002 |
| JP | 2003-015104 | 1/2003 |
| JP | A 2004-045680 | 2/2004 |

* cited by examiner

*Primary Examiner*—Dung T. Nguyen
(74) *Attorney, Agent, or Firm*—Oliff & Berridge, PLC

(57) ABSTRACT

The invention provides a technique to effectively cool an electro-optical device in the electro-optical device encased in a mounting case. The mounting case can include a plate member arranged so as to face one surface of a liquid crystal panel and a cover member arranged so as to cover the plate and the liquid crystal panel. Cooling-air guiding portions that include at least some of the side surfaces of the liquid crystal panel as at least some of the surfaces that constitute the passage can be provided in the cover member.

10 Claims, 8 Drawing Sheets

ELECTRO-OPTICAL DEVICE ENCASED IN MOUNTING CASE, PROJECTION DISPLAY APPARATUS, AND MOUNTING CASE

BACKGROUND OF THE INVENTION

1. Field of Invention

The present invention relates to a mounting case for accommodating an electro-optical device, such as a liquid crystal panel, which is used as a light valve for a projection display apparatus, such as a liquid crystal projector, an electro-optical device encased in a mounting case, in which the electro-optical device is accommodated, and a projection display apparatus having the electro-optical device encased in the mounting case.

2. Description of Related Art

In general, when a liquid crystal panel is used as a light valve of a liquid crystal projector, the liquid crystal panel is not provided in an exposed state on a console, etc., constituting the liquid crystal projector, but it is accommodated or encased in a suitable mounting case, and then the mounting case including the liquid crystal panel is provided on the console. This is because the liquid crystal panel can easily be fixed to the case by suitably providing screws in the corresponding mounting case.

In the liquid crystal projector, the light emitted from a light source is projected onto the liquid crystal panel encased in the mounting case as focused light. Light passing through the liquid crystal panel is enlarged and projected on the screen to display images. In such a liquid crystal projector, since the enlarged projection is generally predetermined, relatively intense light emitted from a light source such as a metal halide lamp is used.

However, in this construction, first, there is a problem in that the temperature of the liquid-crystal-panel encased in the mounting case, and particularly of the liquid crystal panel rises. The rise in temperature causes a rise in temperature of the liquid crystal interposed between a pair of transparent substrates in the liquid crystal panel. Therefore, the characteristics of the liquid crystal are deteriorated. In addition, when the light emitted from the source light is uneven, the liquid crystal panel is partially heated to generate so called hot spots, and then variations in the transmittance are generated at the hot spots. Thus, the quality of projected images deteriorates.

The technique for preventing the rise in temperature of the liquid crystal panel includes, for example, one disclosed in, for example, International Publication Number WO98/36313, etc. The patent discloses a technique by providing the heat radiating sheet between the liquid crystal panel and a heat radiating plate in the liquid crystal display module comprising the liquid crystal panel and a case (referred as a 'mounting case' in this specification) holding and accommodating the liquid crystal panel and having the heat radiating plate. In addition, in order to solve the above problems, other approaches, such as an approach of providing a light shielding film on a substrate positioned at the side of the liquid crystal panel on which light is incident and an approach of forming the mounting case, in which the liquid crystal panel is held or accommodated, using a light reflective material, have been known.

SUMMARY OF THE INVENTION

However, the conventional approaches for preventing the rise in temperature of the liquid crystal panel have the following problems. As long as intense light is emitted from the light source, the problem of the rise in temperature of the liquid crystal panel may occur at any time. Therefore, in order to obtain still higher image quality, the more effective measures to prevent the rise in temperature are required instead of or in addition to the aforementioned approaches. For example, according to the approach of using the radiating sheet disclosed in the above described International Publication Number WO98/36313, the heat accumulated in the liquid crystal panel can be effectively radiated to the outside. However, according to International Publication Number WO98/36313, as referred to the radiating 'plate' or the radiating 'sheet' or as shown in FIG. 2 of International Publication Number WO98/36313, assuming that the radiating plate is provided to cover the entire surface of the substrate, the approach can be used for a reflective liquid crystal panel, but cannot be used for a transmissive liquid crystal panel.

In addition, according to the approach of reflecting light by the light shielding film and the mounting case, as the areas of the light shielding film and the mounting case increase, the amount of the reflected light increases. Thus, the rise in temperature of the liquid crystal panel can be surely prevented. However, if the amount of the reflected light increases indiscriminately, the stray light increases in the housing for accommodating the liquid crystal panel in the mounting case. Thus, the quality of images can be deteriorated. In addition, since the increase of the area of the light shielding film causes the reduction of the amount of the light from the source light, which is otherwise to be originally incident onto and to pass through the liquid crystal panel, the image can be darkened. Thus, it is contrary to the aforementioned purpose in which the intense light is used in order to display a brighter image. Accordingly, the aforementioned conventional approaches do not have a drastic measure for the above problems.

The invention is contrived to solve the above problems, and an object of the invention is to provide an electro-optical device encased in a mounting case capable of effectively suppressing the rise in temperature of the electro-optical device, to which relatively intense light is incident, and a projection display apparatus comprising the electro-optical device encased in the mounting case. In addition, it is another object of the invention to provide a mounting case suitable for the electro-optical device encased in the mounting case.

In order to solve the above problems, a first electro-optical device encased in a mounting case can be obtained by accommodating in a mounting case an electro-optical device having an image display region on which projection light from a light source is incident, the mounting case can include a plate disposed so as to face one surface of the electro-optical device, a cover disposed so as to cover the plate and the electro-optical device, and cooling-air guiding portions each including at least some of side surfaces of the electro-optical device as at least some of surfaces that constitute a cooling air passage.

According to a first electro-optical device encased in the mounting case of the invention, the electro-optical device having the image display region on which the projection light from the light source is incident, can be accommodated into the mounting case having the plate and the cover. The electro-optical device includes, for example, a liquid crystal device or a liquid crystal panel that is mounted as a light valve of the projection display apparatus. In addition, the mounting case preferably has an additional function such as a light shielding function for preventing the leakage of light in the peripheral region of the electro-optical device and the entrance of the stray light from the peripheral region into the image display region by partially covering at least a portion of the peripheral region of the electro-optical device.

According to the invention, in particular, the mounting case can also include cooling-air guiding portions that include at least some of the side surfaces of the electro-optical device as at least some of the surfaces that constitute passage of the cooling air. Therefore, according to the invention, when air is exhausted through the passage of the cooling-air guiding portion, the air can deprive one side surface of the electro-optical device of the heat of the electro-optical device.

As mentioned above, according to the invention, even though relatively intense projection light which is incident onto the elector-optical device results in the rise in temperature of the electro-optical device, it is possible to effectively cool the electro-optical device. Therefore, when the electro-optical device is the liquid crystal panel, it is possible to prevent the deterioration of the liquid crystal layer of the liquid crystal panel and to prevent the generation of the hot spots in the liquid crystal layer. Therefore, according to the electro-optical device of the present invention, it is possible to display high quality images.

The structures of the cooling-air guiding portion and the passage thereof according to the invention are various. For example, when the shape of the entire passage is rectangular parallelepiped (that is, the sectional shape of the passage is rectangular), it may be assumed that a first side surface of the rectangular parallelepiped is constituted of one surface of the electro-optical device, that a second side surface that faces the first side surface is constituted of an inner surface of the cover, that a third side surface connected to the first side surface and the second side surface is constituted of a part of a surface of the plate that faces one surface of the electro-optical device, and that a fourth side surface that faces the third side surface is constituted of a part of the surface connected to the inner surface of the cover.

In an aspect of a first electro-optical device encased in a mounting case according to the invention, at least some of the surfaces other than the surface including at least some of the side surface of the electro-optical device among the surfaces that constitute the passage can include at least a part of the inner surface of at least one of the cover and the plate.

According to this aspect, since at least some of the other surfaces includes at least a part of the inner surface of at least one (hereinafter, represented as the cover) of the cover and the plate arranged so as to cover the electro-optical device, the air exhausted through the passage can deprive the cover of heat. Therefore, when the cover is arranged so that the cover contacts with the electro-optical device, the heat of the electro-optical device is transmitted to the cover and the air deprives the cover of the heat accumulated in the cover. As a result, the cover can effectively function as a heat sink of the electro-optical device. Therefore, since it is possible to prevent the accumulation of heat in the electro-optical device, it is possible to display high quality images.

The above-mentioned are agree with that of the plate arranged so as to face one surface of the electro-optical device.

The inner surface mentioned in the aspect refers to a visible surface in the cover and the plate that constitute the mounting case when seen from a place in which the electro-optical device is arranged, that is, a surface that constitute the inside of the mounting case that faces a part of the electro-optical device.

In another aspect of the first electro-optical device encased in the mounting case according to the invention, each of the cooling-air guiding portions can include a first hole formed in one surface of the cover as an inlet of the cooling air, and a second hole formed in a surface that faces the one surface of the cover as an outlet of the cooling air.

According to this aspect, since the cooling-air guiding portion and the passage thereof include the inlet and the exit of the cooling air, the air blows more actively. Therefore, it is possible to actively perform the direct cooling of the electro-optical device, in which the cooling air deprives the side surfaces of the electro-optical device of heat, and the indirect cooling of the electro-optical device, in which the cover and the plate are cooled (that is, they effectively function as heat sinks) to thus cool the electro-optical device.

In another aspect of the first electro-optical device encased in the mounting case according to the invention, a plurality of the passages can be provided, at least some of the surfaces that constitute one passage includes at least some of the side surfaces of the electro-optical device, and wherein at least some of surfaces that constitute the other passages comprises at least some of the side surfaces opposite to the side surfaces of the electro-optical device.

According to this aspect, since both surfaces of the electro-optical device constitute at least some of the surfaces that constitute the passage, the electro-optical device is deprived of heat from both surfaces. Therefore, the direct cooling for the electro-optical device is more effectively performed.

In another aspect of the first electro-optical device encased in the mounting case according to the invention, the cover can include a cover main body having a window corresponding to the image display region, and a cooling-air introducing portion connected to the cover main body or extended from the cover main body, the cooling-air introducing portion transmitting the cooling air to the surface of the electro-optical device exposed through the window. The inlet of the cooling-air guiding portion is formed in a portion of the cover main body where the cooling-air introducing portion is not provided.

According to this aspect, since the cover includes the above-mentioned cooling-air introducing portion, it is possible to effectively deprive the surface of the electro-optical device of heat. According to this aspect, furthermore, the inlet of the cooling-air guiding portion can be formed in a cover main body in a portion where the cooling-air introducing portion is not provided. Therefore, it is possible to effectively send the cooling air exhausted from the inlet of the cooling-air guiding portion and entering the inside of the mounting case toward the side surfaces of the electro-optical device.

As mentioned above, according to the present aspect, the surface of the electro-optical device is cooled by the cooling air transmitted from the cooling-air introducing portion to the cover main body and the window of the cover main body. The side surfaces of the electro-optical device are cooled by the cooling air that passes through the cooling-air guiding portion. Therefore, it is possible to effectively cool the entire electro-optical device.

In another aspect of the first electro-optical device encased in the mounting case according to the invention, the cover comprises a surface-area increasing device. According to this aspect, since the cover includes the area increasing device, it is possible to effectively cool the cover. In this case, when the cover functions as the heat sink of the electro-optical device as mentioned above, it is possible to enhance the function and to thus effectively cool the electro-optical device.

The area increasing means mentioned in the present aspect includes a fin that protrudes from the surface of the cover and a dimple concaved in the surface of the cover. Furthermore, the difference between the fin and the dimple lies in that whether it protrudes from or is concaved in a reference surface that is the surface of the cover including one of the inner surface as mentioned above and the external surface to the contrary. The fin or the dimple can be formed by a cutting process, a forging process, a pressing process, an injection molding process, or a casting process together with the cover main body or after forming the cover main body.

In another aspect of the first electro-optical device encased in the mounting case according to the invention, at least one of the cover and the plate contacts at least a part of the electro-optical device. According to this aspect, heat is evenly transmitted from the electro-optical device to the cover and the plate. Therefore, it is possible to effectively deprive the electro-optical device of the heat and to thus effectively cool the electro-optical device. According to the present aspect, since at least some of the surfaces that constitute the passage of the cooling-air guiding portion includes at least some of the inner surfaces of at least one of the cover and the plate, the cover and the plate can effectively function as heat sinks.

In order to solve the above problems, a second electro-optical device encased in the mounting case according to the invention is obtained by accommodating an electro-optical device having an image display region, on which projection light from a light source is incident, in a mounting case, wherein the mounting case comprises a plate disposed so as to face one surface of the electro-optical device, a cover disposed so as to cover the plate and the electro-optical device, and cooling-air introducing inlets formed in the side surfaces of the cover, the side surfaces being positioned above the cooling air transmitted into the electro-optical device encased in the mounting case.

According to the second electro-optical device encased in the mounting case, the mounting case can include the same plate and cover as the first electro-optical device encased in the mounting case, and cooling-air guiding portions being positioned in the side surfaces of the cover and at an upstream of the cooling air transmitted to the electro-optical device encased in the mounting case. Therefore, according to the invention, it is possible to enter the cooling air to the mounting case from the cooling-air introducing inlet. The cooling air can deprive the electro-optical device of the heat.

As mentioned above, according to the invention, even though relatively intense projection light incident on the electro-optical device results in the rise in temperature of the electro-optical device, it is possible to effectively cool the electro-optical device. Therefore, when the electro-optical device is the liquid crystal panel, it is possible to prevent the deterioration of the liquid crystal layer of the liquid crystal panel and to prevent the generation of the hot spots in the liquid crystal layer. Therefore, according to the electro-optical device of the invention, it is possible to display high quality images.

The cooling-air introducing inlet according to the present invention corresponds to the first hole or the inlet of the cooling-air introducing portion in various aspects of a first electro-optical device encased in the mounting case according to the present invention. Therefore, it is possible to apply the aspect with the corresponding element to a second electro-optical device encased in the mounting case according to the invention.

In order to solve the above problems, the mounting case according to the invention for accommodating an electro-optical device having an image display region on which projection light from a light source is incident includes a plate arranged so as to face one surface of the electro-optical device, a cover disposed so as to cover the plate and the electro-optical device, and cooling-air guiding portions that include at least some of the side surfaces of the electro-optical device as at least some of the surfaces that constitute the cooling air passage.

According to the mounting case of the invention, it is possible to provide a mounting case appropriate to be used for the above electro-optical device encased in the mounting case according to the invention.

In order to solve the above problems, a projection display apparatus can include the above electro-optical device encased in the mounting case according to the invention (but, including various aspects), a light source, an optical system for guiding the projection light onto the electro-optical device, a projection optical system for projecting the projection light emitted from the electro-optical device, and cooling-air transmitting means for transmitting cooling air to the electro-optical device encased in the mounting case. Since the projection display apparatus according to the invention includes the electro-optical device encased in the mounting case according to the present invention, the mounting case includes the cooling-air guiding portion or the cooling-air introducing inlet and the projection display apparatus includes the cooling-air transmitting means. Therefore, it is possible to effectively cool the electro-optical device and to thus display high quality images.

The operations and other advantages of the invention will be apparent from the embodiments described below.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Now, embodiments of the invention will be described with reference to the accompanying drawings.

Firstly, with reference to FIG. 1, an embodiment of a liquid crystal projection apparatus according to the present invention will be described on the basis of an optical system into which optical units are assembled. As an example of an electro-optical device encased in a mounting case, the projection display apparatus of the embodiment is constructed as a multi-panel color projector composed of three liquid light valves.

Figure 1:
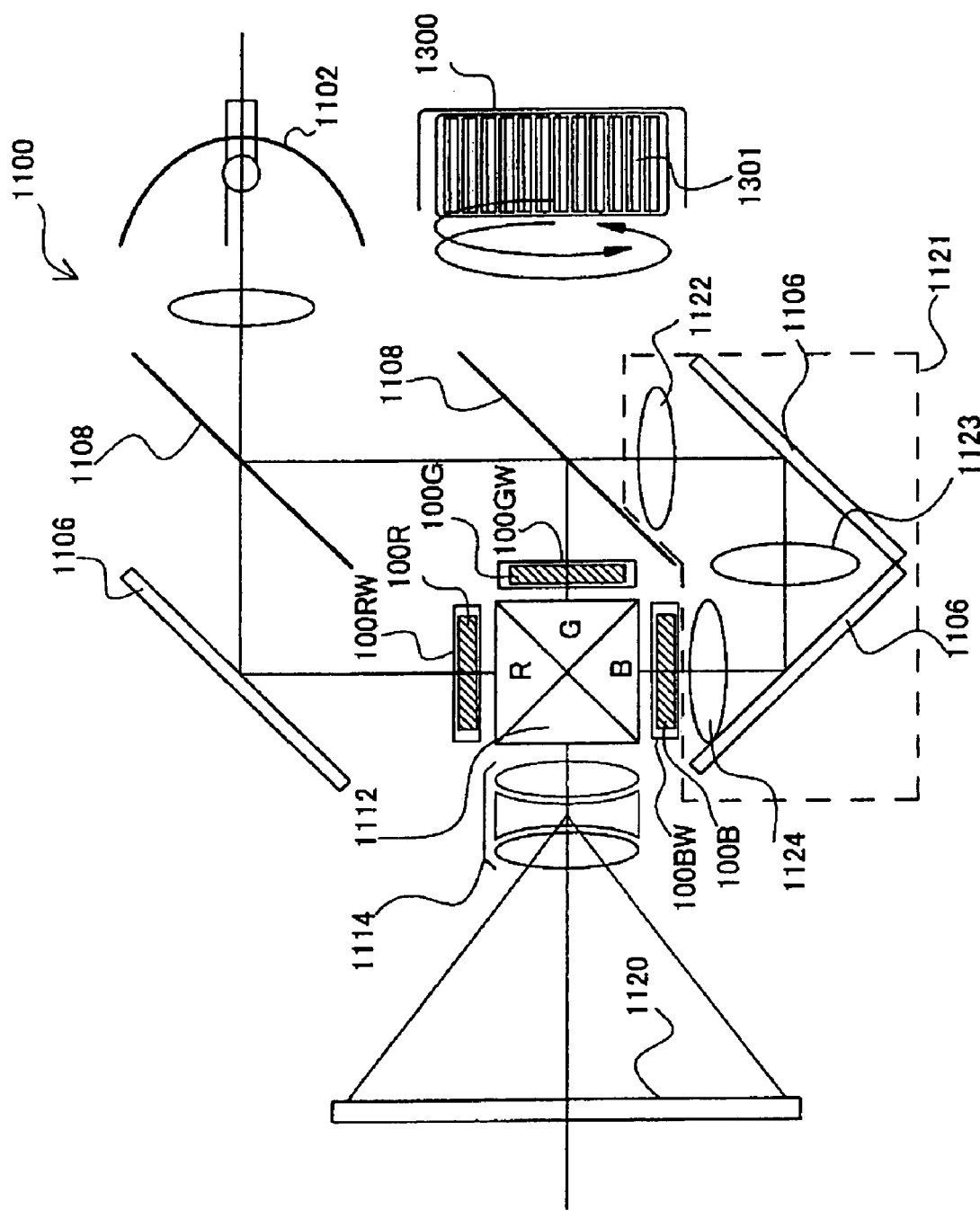
FIG. 1 is a plan view illustrating an embodiment of a liquid crystal projection apparatus according to the present invention.

In FIG. 1, a liquid crystal projector 1100, an example of the multi-panel color projector, is a projector which utilizes three liquid crystal light valves having electro-optical devices in which driving circuits are mounted on TFT array substrates as RGB light valves 100R, 100G, and 100B.

In the liquid crystal projector 1100, the light emitted from a lamp unit 1102, which is a white light source, such as a metal halide lamp is divided into R, G, and B light components corresponding to three primary colors R, G, and B by three mirrors 1106 and two dichroic mirrors 1108, and the light components are guided into the light valves 100R, 100G, and 100B corresponding to the colors. In particular, the B light component is guided through a relay lens system 1121 having an incident lens 1122, a relay lens 1123, and an emitting lens 1124 in order to prevent the loss of light due to its long optical path. The light components corresponding to the three primary colors, which are modulated by the light valves 100R, 100G, and 100B, are synthesized by a dichroic prism 1112 and then projected on the screen 1120 as a color image through a projection lens 1114.

Active matrix drive liquid crystal apparatus, in which TFTs are used as switching devices, are used as the light valves 100R, 100G, and 100B of the embodiment. The light valves 100R, 100G, and 100B are composed as electro-optical devices encased in the mounting cases as described below in greater detail.

Further, as shown in FIG. 1, a sirocco fan 1300 for sending cooling air to the light valves 100R, 100G, and 100B is provided in such a liquid crystal projector 1100. The sirocco fan 1300 can include a substantially cylindrical member having a plurality of blades 1301 in the side surface thereof, and the blades 1301 generate wind by rotating the cylindrical member with its axis as a center. The wind generated by the sirocco fan 1300 in accordance with such a principle flows in whirls, as shown in FIG. 1.

The wind is supplied to the respective light valves 100R, 100G, and 100B through an air passage (not shown in FIG. 1), and blows from respective outlets 100RW, 100GW, and 100BW provided near the light valves 100R, 100G, and 100B to the light valves 100R, 100G, and 100B. If the sirocco fan 1300, as described above, is used it is possible to obtain an advantage that the wind is easily supplied to narrow spaces around the light valves 100R, 100G, and 100B because the wind has a high static pressure.

In the aforementioned construction, the light emitted from the lamp unit 1102, which is an intense light source, raises the temperatures of the light valves 100R, 100G, and 100B. At that time, if the temperatures rise excessively, the liquid crystal constituting the light valves 100R, 100G, and 100B may be deteriorated, or hot spots generated by the partial heating of portions of the liquid crystal panel due to the unevenness of light emitted from the light source cause variations in the transmittance. For this reason, particularly, in the embodiment, mounting cases capable of cooling the electro-optical devices are provided in the respective light valves 100R, 100G, and 100B, as described below. Therefore, it is possible to effectively suppress the rise in temperature of the light valves 100R, 100G, and 100B, as described later.

In the embodiment, it is preferable that cooling device having a circulating unit for flowing a coolant in the spaces surrounding the light valves 100R, 100G, and 100B be provided within a housing of the liquid crystal projector 1100. In this way, it is possible to further effectively radiate the heat of the electro-optical device encased in the mounting case, which has a heat radiating function, as described later.

Figure 2:
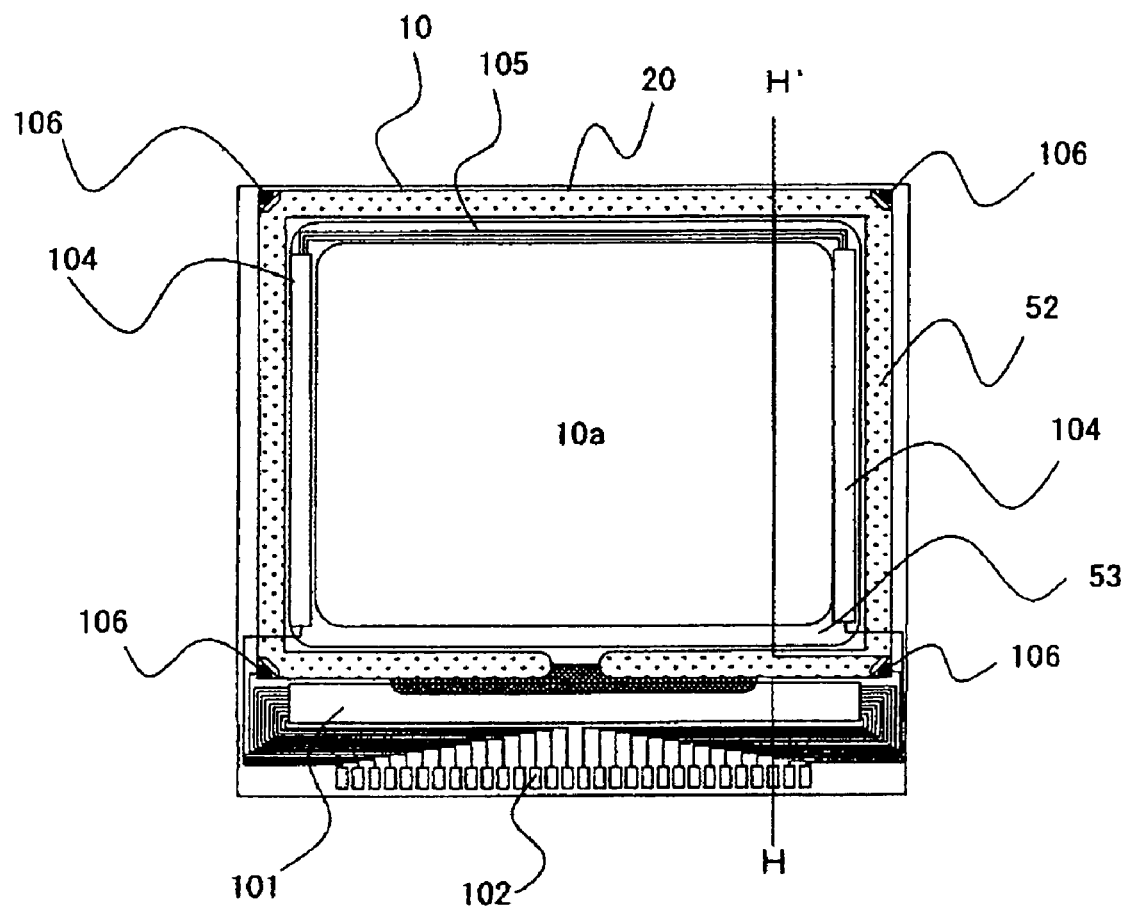
FIG. 2 is a plan view illustrating an embodiment of an electro-optical device according to the present invention.
Figure 3:
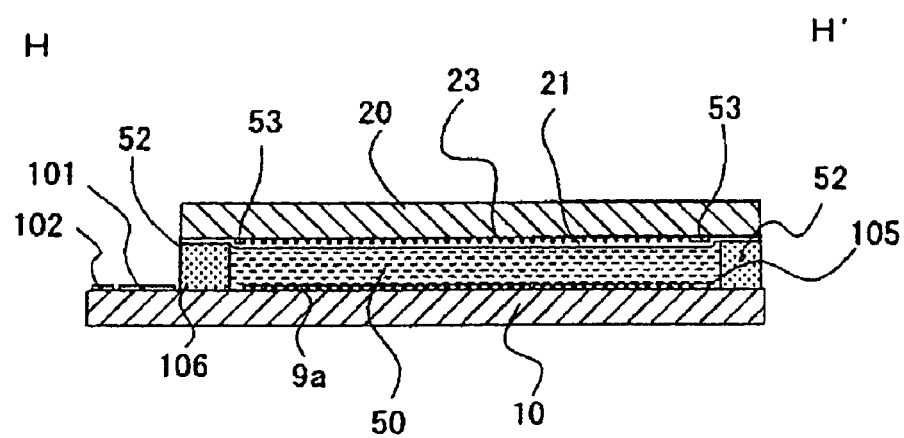
FIG. 3 is a cross-sectional view taken along the line H–H' shown in FIG. 2.

Next, the overall construction of an electro-optical apparatus according to an embodiment of the present invention will be described with reference to FIGS. 2 and 3. Herein, TFT active drive liquid crystal device with a built-in driving circuit is illustrated as an example of an electro-optical device. The electro-optical device according to the embodiment is used as liquid light valves 100R, 100G, and 100B of the aforementioned liquid crystal projector 1100. Herein, FIG. 2 is a plan view of the electro-optical device and illustrates a TFT array substrate and constructional components provided thereon as shown from the counter substrate. FIG. 3 is a cross-sectional view taken along the line H–H' shown in FIG. 2.

Referring to FIGS. 2 and 3, in the electro-optical device according to the embodiment, the TFT array substrate 10 is disposed to face the counter substrate 20. A liquid crystal layer 50 is sealed between the TFT array substrate 10 and the counter substrate 20. The TFT array substrate 10 and the counter substrate 20 are bonded to each other by a seal member 52 disposed at a seal region which is located around an image display region 10a.

The seal member 52 for bonding both substrates is made of, for example, ultraviolet curable resin, thermosetting resin, and the like, which are applied on the TFT array substrate 10 and then cured by ultraviolet ray irradiation or heating in manufacturing processes. In addition, spacers made of a material, such as glass fiber or glass bead are dispersed in the seal member 52 to keep the gap between the TFT array substrate 10 and the counter substrate 20 (the gap between the substrates) at a predetermined interval. Therefore, the electro-optical device of the embodiment is used for a light valve of the projector as a small-sized device and is suitable for enlarging and displaying images.

A frame light shielding film 53 for defining a frame region of the image display region 10a is provided on the counter substrate 20 parallel to the inner side of the seal region where the seal member 52 is disposed. All or a portion of the frame light shielding film 53 may be provided on the TFT array substrate 10 as a built-in light shielding film.

In the peripheral region located at the outer side of the seal region, where the seal member 52 is disposed, among regions extending to the circumference of the image display region, a data line driving circuit 101 and an external circuit connection terminal 102 are provided along one side of the TFT array substrate 10, and scanning line driving circuits 104 are provided along two sides adjacent to the one side so as to be covered with the frame light shielding film 53. In order to connect the two scanning line driving circuits 104 provided along the two sides of the image display region 10a to each other, a plurality of wiring lines 105 is provided along the remaining one side of the TFT array substrate 10 so as to be covered with the frame light shielding film 53.

Further, upper and lower conducting members 106 for serving as upper and lower conduction terminals between the two substrates are disposed at four corners of the counter substrate 20. On the other hand, on the TFT array substrate 10, the upper and lower conduction terminals are provided at the regions opposite to the corners. Through these members, the electrical conduction is made between the TFT array substrate 10 and the counter substrate 20.

In FIG. 3, TFTs for pixel switching and wiring lines, such as scanning lines and data lines, are formed on a pixel electrode 90 on the TFT array substrate 10, and then, alignment layers which are not shown are formed on the pixel electrode 9*a*. On the other hand, on the counter substrate 20, a counter electrode 21 and a light shielding film 23 in a lattice or stripe shape are provided, and in addition, an alignment layer which is not shown is formed on the uppermost portion thereof. A liquid crystal layer 50, which is made of, for example, one kind of nematic liquid crystal or a mixture of plural kinds of nematic liquid crystal, takes a predetermined alignment state between a pair of alignment layers.

In addition to the data line driving circuit 101 and the scanning line driving circuits 104, etc., a sampling circuit for sampling image signals on image signal lines to supply those to data lines, a precharge circuit for supplying the precharge signals of a predetermined level to a plurality of data lines prior to the image signals, and a test circuit for inspecting the quality and defects of the electro-optical device during the manufacturing process or at the time of forwarding may be formed on the TFT array substrate 10 shown in FIGS. 2 and 3, and the like.

Figure 4:
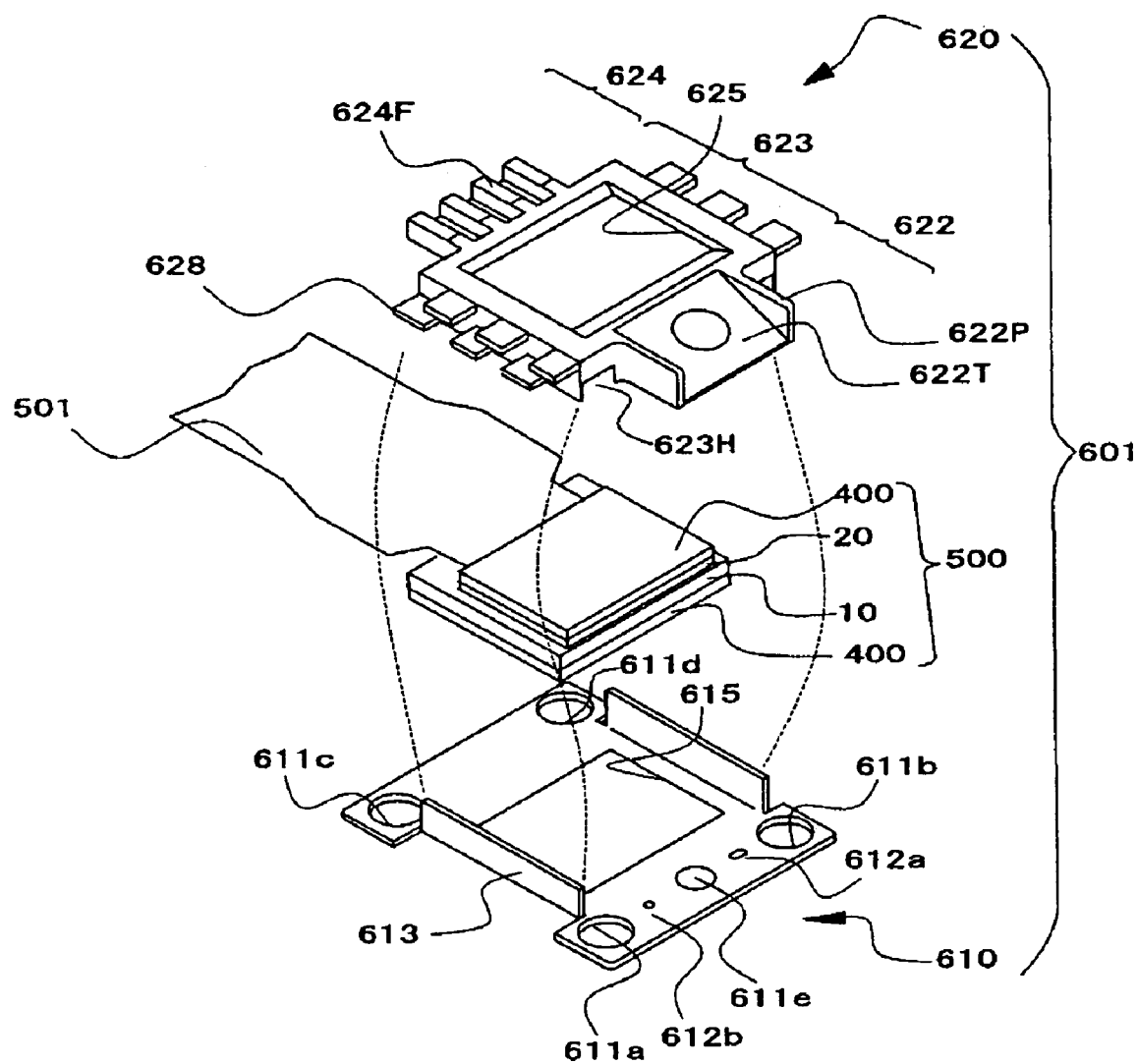
FIG. 4 is an exploded perspective view illustrating an electro-optical device together with a mounting case according to a first embodiment of the present invention.
Figure 5:
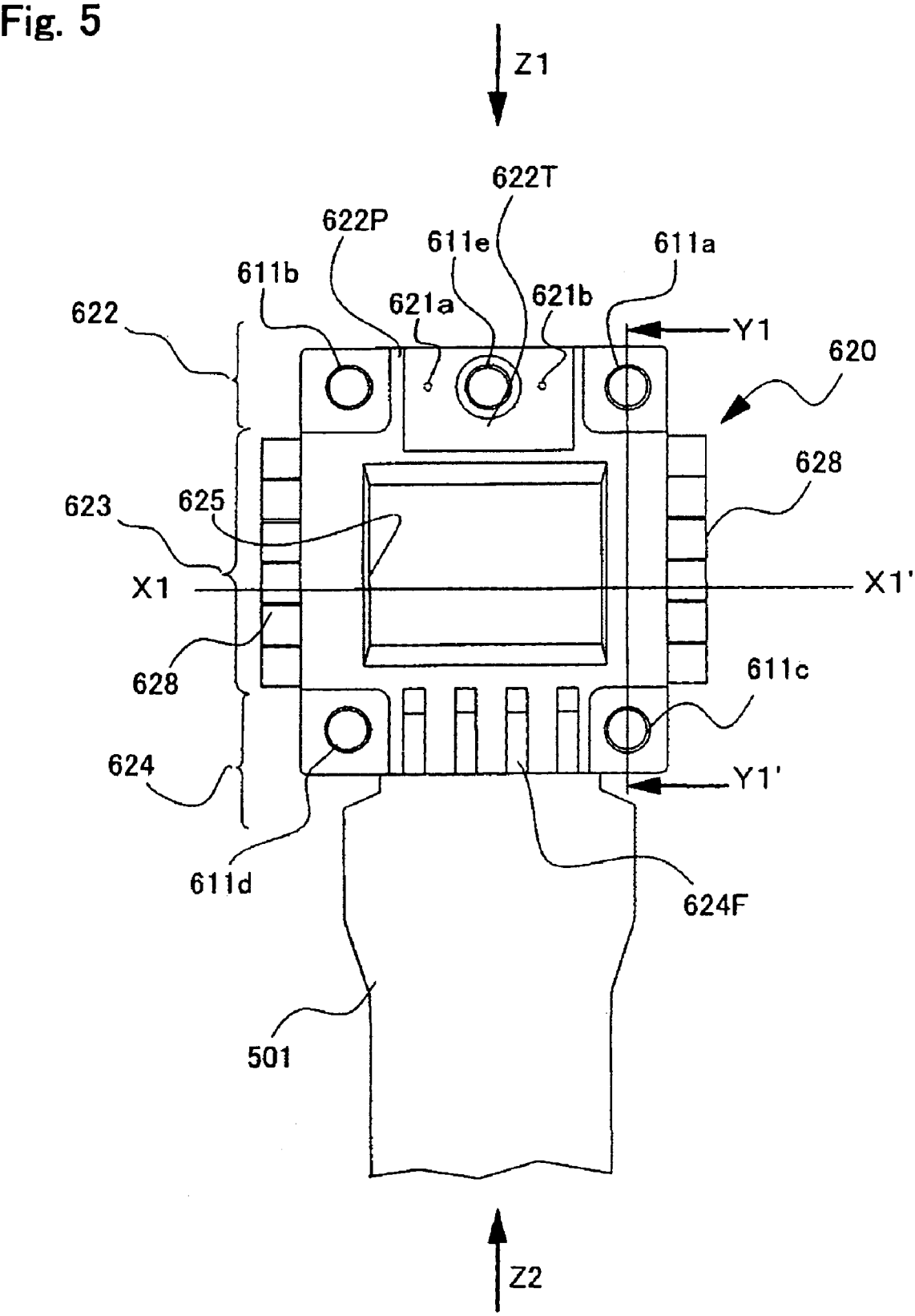
FIG. 5 is a front view of the electro-optical device encased in the mounting case according to the embodiment of the present invention.
Figure 6:
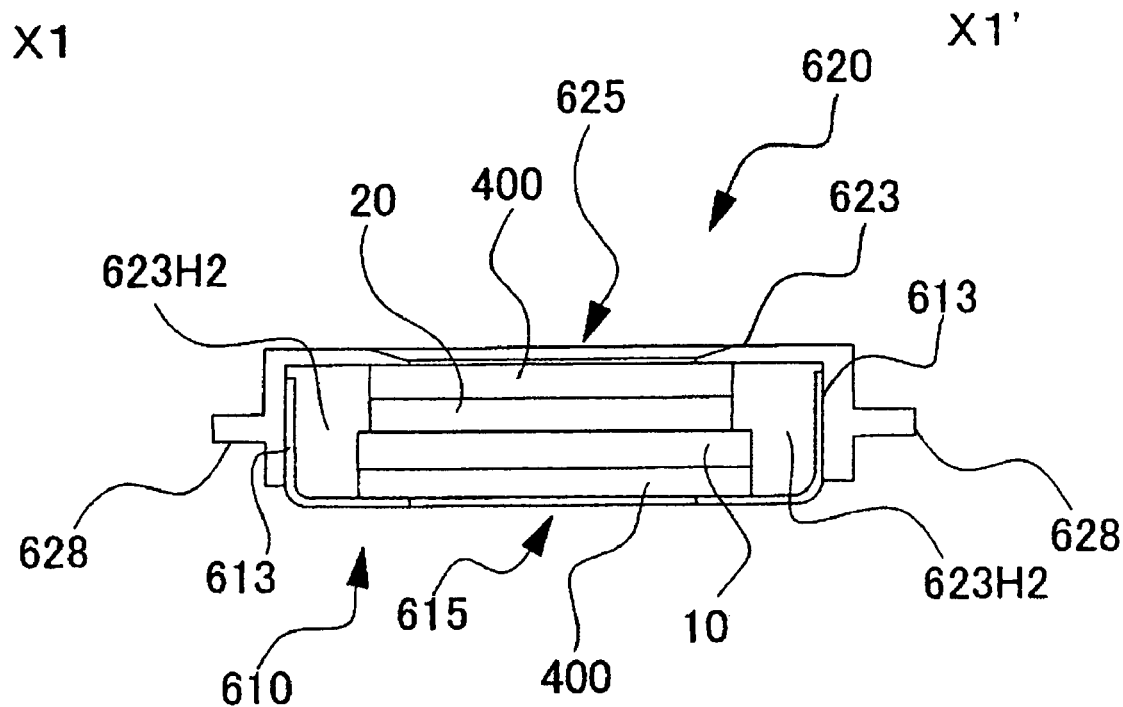
FIG. 6 is a cross-sectional view taken along the line X1–X1' shown in FIG. 5.
Figure 7:
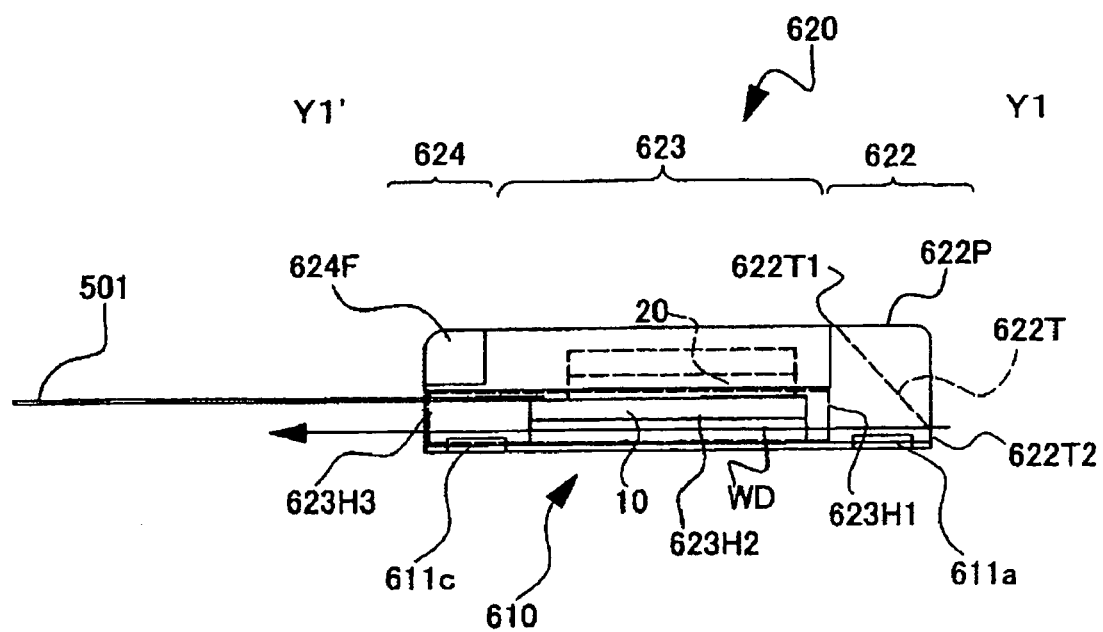
FIG. 7 is a perspective view taken along the line Y1–Y1' shown in FIG. 5.
Figure 8:
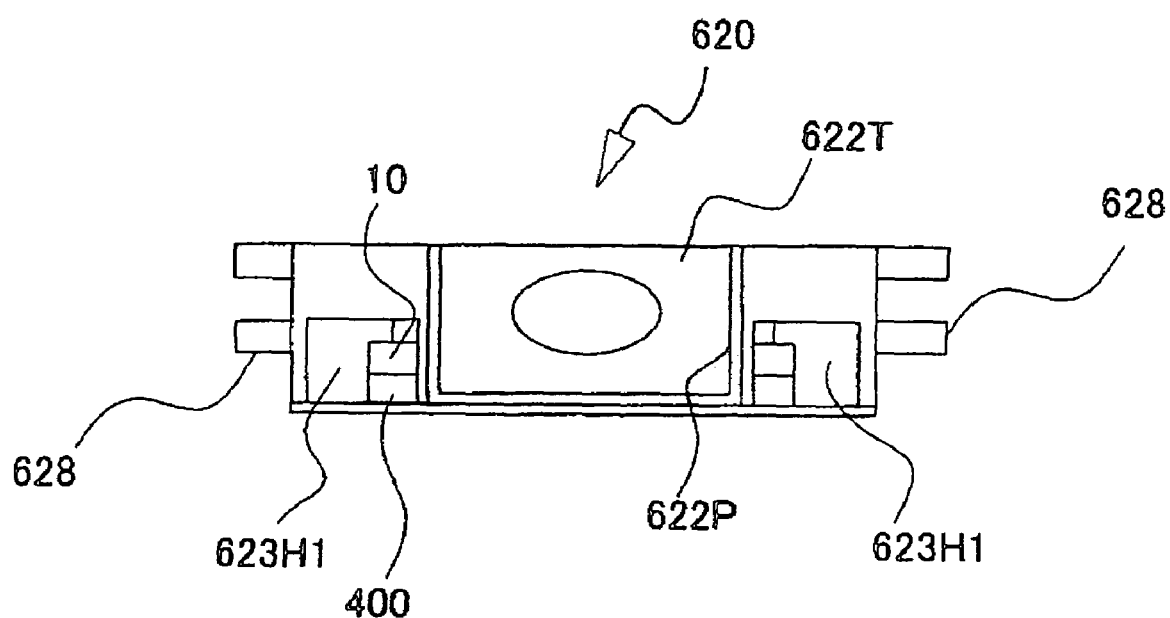
FIG. 8 is a front view shown from the direction of Z1 shown in FIG. 5.
Figure 9:
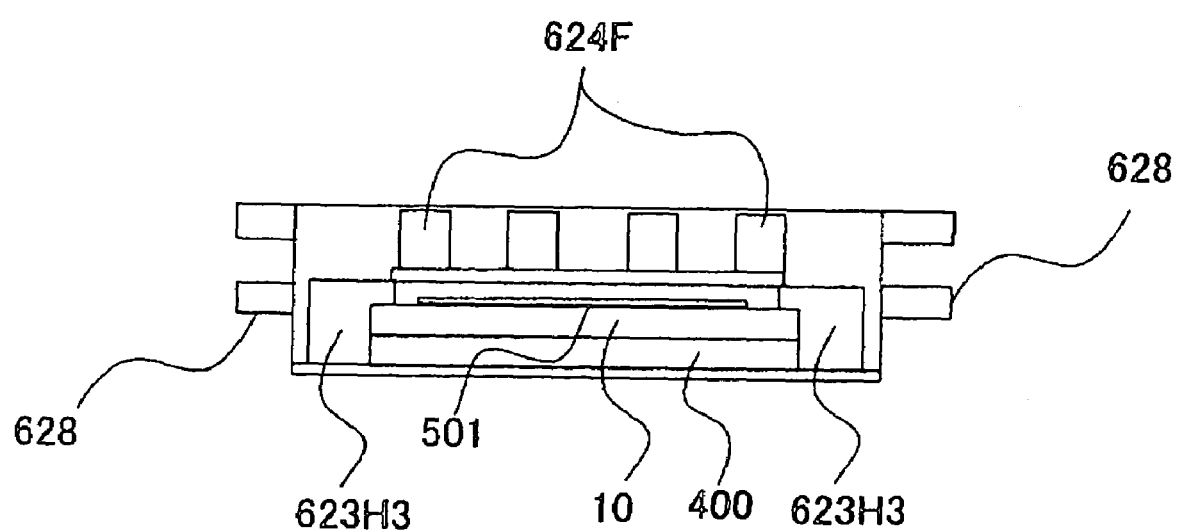
FIG. 9 is a back view shown from the direction of Z2 shown in FIG. 5.

Next, an electro-optical device encased in the mounting case according to an embodiment of the invention will be described with reference to FIGS. 4 to 9. Herein, FIG. 4 is an exploded perspective view illustrating an electro-optical device together with a mounting case according to the embodiment, FIG. 5 is a front view of the electro-optical device encased in the mounting case, FIG. 6 is a cross-sectional view taken along the line X1–X1' of FIG. 5, and FIG. 7 is a perspective view shown from the line Y1–Y1' in FIG. 5. FIG. 8 is a front view shown from the direction of Z1 shown in FIG. 5. FIG. 9 is a back view shown from the direction Z2 shown in FIG. 5. FIGS. 4 to 9 illustrate the mounting case in which electro-optical panels are accommodated, respectively.

As shown in FIGS. 4 to 9, the mounting case 601 can include the plate member 610 and the cover member 620. The electro-optical device 500, which is accommodated within the mounting case 601, comprises another optical component such as a reflection preventing plate overlapped with the surface thereof in addition to the electro-optical devices shown in FIGS. 2 and 3, and a flexible connector 501 is connected to an external circuit connecting terminal. Furthermore, a polarizing plate or a retardation plate may be provided to the optical system of liquid crystal projector 1100, or it may be overlapped with the surface of the electro-optical device 500. Moreover, a dustproof substrate 400 is provided in portions not facing the liquid crystal layers 50 in the TFT array substrate 10 and the counter substrate 20 (see FIG. 4, etc.). The dustproof substrate prevents dirt or dust around the electro-optical device 500 from being directly stuck onto the surface of the electro-optical device. Therefore, it is possible to effectively remove a defect that a figure of dirt or dust appears on the magnified projection image (a defocusing operation).

According to this embodiment, it is premised that light is incident from the cover member 620, transmits through the electro-optical device 500, and is emitted from the plate member 610. That is, in FIG. 1, what faces the dichroic prism 1112 is not the cover member 620 but the plate member 610.

The construction of the plate member 610 and the cover member 620 constituting the mounting case 601 will be described below in more detail.

Firstly, as shown in FIG. 4, the plate member 610 is a member having a substantially quadrilateral shape in plan view and is disposed to face one surface of the electro-optical device 500. In this embodiment, the plate member 610 and the electro-optical device 500 are directly abutted against each other, and the latter is mounted on the former. More specifically, the plate member 610 comprises a window 615, bent portions 613, a cover-member-fixing hole 612, and an attaching hole 611.

The window 615 is formed in an opening shape in which a portion of the member having the substantially quadrilateral shape is opened. For example, the window 61.5 is a member of enabling light to transmit from the upper side to the lower side in FIG. 6. The light transmitted from the electro-optical device 500 can be emitted through the window 615. When the electro-optical device 500 is mounted on the plate member 610, the peripheral region around the image display region 10*a* in the electro-optical device 500 is in a state abutting against the edge of the window 615. In this manner, the plate member 610 holds the electro-optical device 500. Further, since the electro-optical device 500 contacts with the edge of the window 615, heat is evenly transmitted from the former to the latter.

The bent portions 613 are portions formed by bending a portion of each of two opposite sides of the member having the substantially quadrilateral shape toward the inside of the quadrilateral shape. The outer surfaces of the bent portions 613 are abutted against the inner surface of the cover member 620 when bonding the plate member 610 to the cover member 620 (see FIG. 6). Therefore, the heat transmitted from the electro-optical device 500 to the plate member 610 may be transmitted to the cover member 620 through the bent portions 613.

The cover-member-fixing hole portion 612 is a hole portion for being engaged with a convex portion 621 provided at the corresponding location in the cover member 620. The plate member 610 and the cover member 620 are fixed to each other by engaging the cover-member-fixing hole portion 612 with the convex portion 621. In addition, in this embodiment, the cover member fixing hole 612 comprises two holes as shown in each figure (In case of need of distinguishing the holes, the two holes are referred to as cover member fixing holes 612*a* and 612*b*, respectively). Corresponding to the holes, the convex portion 621 comprises two convex portions (In case of need of distinguishing the convex portions, the two convex portions are referred to as convex portions 621*a* and 621*b*, respectively).

The attaching holes 611*a* to 611*d* are used for attaching the electro-optical device encased in the mounting case to the liquid crystal projector 1100 illustrated in FIG. 1. According to the embodiment, the attaching holes 611*a* to 611*d* are provided at four corners of an almost quadrangular member. According to the embodiment, an attaching hole 611*e* is provided other than the attaching holes 611*a* to 61 id. The attaching hole 611*e* is arranged so as to form a triangle together with the attaching holes 611*c* and 611*d* among the attaching holes 611*a* to 61 id (that is, the attaching holes 611*e*, 611*c*, and 61 id are arranged in the respective apexes of the triangle). Therefore, according to the embodiment, it is possible to fix four points using the attaching holes 611*a* to 611d at the four corners and to fix three points using the attaching holes 611e, 611c, and 611d.

Next, secondly, the cover member 620, as shown in FIG. 4 to FIG. 9, is a substantially hexahedral member, and is arranged to face the surface opposite to the surface facing the plate member 610 in the electro-optical device 500.

The cover member 620 is preferably made of light shielding resin, metallic material, and the like in order to prevent the leakage of the light in the peripheral region of the electro-optical device 500 and the introduction of the stray light from the peripheral region to the image display region 10a. Since it is preferable that the cover member 620 functions as a heat sink for the plate member 610 or the electro-optical device 500, the cover member 620 is preferably made of materials of relatively high heat conductivity, such as aluminum, magnesium, copper, or an alloy thereof.

More specifically, the cover member 620 can include the convex portion 621, a cooling-air introducing portion 622, a cooling-air discharging portion 624, and a cover main body 623. The convex portion 621 is used for fixing the plate member 610 and comprises two convex portions 621a and 621b at the locations corresponding to the cover-member-fixing holes 612a and 612b. As illustrated in FIG. 5, the convex portion 621 according to this embodiment is formed so as to constitute a part of the cooling-air introducing portion 622 and a later-mentioned tapered portion 622T (the original convex portion 621 is not illustrated in FIG. 5, but the two convex portions are illustrated).

As shown in FIGS. 4 to 9, a cover main body 623 is a member having substantially a rectangular parallelepiped shape, and is interposed between the cooling-air introducing portion 622 and the cooling-air discharging portion 624, which will be described below. The inside of the rectangular parallelepiped shape, in which the electro-optical device 500 is accommodated, is in the so-called hollow state. That is, the cover main body 623 is a coverless box-shaped member (According to such an expression, 'the cover' mentioned here corresponds to the plate member 610.).

More specifically, the cover main body 623 has a window 625, side fin portions 628, and cooling-air guiding portions 623H. The window 625 is formed in the bottom surface (the top surface in FIG. 4 or 6) of the box-shaped member having an opening and transmits light from the top to the bottom in FIG. 6. The light emitted from the lamp unit 1102 within the liquid crystal projector 1100 shown in FIG. 1 can be incident onto the electro-optical device 500 through the window 625. The edge of the window 625 abuts the peripheral region of the electro-optical device 500 like as the edge of the window 615 of the plate member 610. Therefore, the heat is evenly transmitted from the electro-optical device 500 to the cover member 620.

On the other hand, the side fin portions 628 are formed at both side surface of the cover main body 623. Both side surface indicate the side surface where the cooling-air introducing portion 622 and the cooling-air discharging portion 624, which will be described later, do not exist. More specifically, in the side fin portions 628, portions, which are straightly protruding from the side surface in parallel to each other toward the cooling-air discharging portion 624 from the cooling-air introducing portion 622, are arranged in a zigzag, as shown in FIG. 4 or FIG. 6, etc. In this regard, the surface areas of the cover main body 623 and the cover member 620 increases.

According to the present embodiment, in particular, the cooling-air guiding portions 623H are provided in the cover main body 623, which will be described later.

Moreover, as already described, the inner surface of the cover member 620 is abutted against the outer surfaces of the bent portions 613 in the plate member 610 at the process of assembling the cover member 620 and the plate member 610 together (see FIG. 6). Therefore, the heat of the electro-optical device 500 is effectively transmitted to the plate member 610, the bent portions 613, and the cover member 620.

As well shown in FIG. 4 or 7, the cooling-air introducing portion 622 is composed of a tapered portion 622T and a baffle plate 622P. In this embodiment, the tapered portion 622T has an appearance of a substantially triangular prism with its bottom being a right triangle. In addition, the tapered portion 622T has an appearance where one side surface of the triangular prism is attached on the one side surface of the cover main body 623. In this case, the one side of the triangular prism comprises a side interposed between a right-angle portion of the bottom of the triangular prism and an angle portion adjacent thereto. Therefore, the tapered portion 622T has a base portion 622T1 that is the highest on the side surface of the cover main body 623 (the height mentioned here refers to the distance from the top to the bottom in FIG. 7) and a tip portion 622T2 whose height is gradually reduced from the base portion 622T1. On the other hand, the baffle plate 622P has a shape of a wall erected along one side between two angles except for the right-angle portion on the bottom of the triangular prism. In terms of the aforementioned 'height', the height of the baffle plate 622P is constant at any place between the base portion 622T1 and the tip 622T2 although the height of the tapered portion 622T is gradually lowered from the base portion 622T1 to the tip 622T2.

Finally, the cooling-air discharging portion 624 comprises a rear fin portion 624F as shown in FIG. 4, 5, or 9, etc. More specifically, as shown in FIG. 4, 5, or 9, the rear fin portion 624F has a plurality (four straight protrusion portions are arranged in parallel to each other in FIG. 9, etc.) of straight protrusion portions, which are arranged parallel to each other, so as to correspond to the extending direction of the zigzag side fin portions 628 as mentioned above. In this way, the surface area of the cover member 620 increases.

As mentioned above, the cover member 620 includes the cover main body 623, the cooling-air introducing portion 622, and the cooling-air discharging portion 624. However, according to the embodiment, in particular, the cooling-air guiding portions 623H are provided in the cover main body 623. As illustrated in FIG. 4 or 8, 7, and 9, the cooling-air guiding portions 623H include cooling air inlets 623H1 (FIG. 8), passages 623H2 (FIG. 7), and cooling air outlets 623H3 (FIG. 9). As illustrated in FIG. 8, the cooling air inlets 623H1 are formed on the side surfaces of the cover main body 623 of both side surfaces of the tapered portion 622T. As illustrated in FIG. 9, the cooling air outlets 623H3 are formed on the side surfaces of the cover main body 623 on the lower half of the drawing. Furthermore, a flexible connector 501 connected to the electro-optical device 500 is drawn from the cooling air outlets 623H2 to the outside. As obvious from in FIGS. 8 and 9, the cooling air inlets 623H1 and the cooling air outlets 623H3 are formed on both side surfaces of the cover main body 623, which face each other.

The passages 623H2 are formed between the cooling air inlets 623H1 and the cooling air outlets 623H3. The passages 623H2 correspond to a part of the portion which is bored inside the cover main body 623. According to the embodiment, since the two cooling air inlets 623H1 are provided as illustrated in FIG. 9, it is considered that the two corresponding passages 623H2 are provided.

The passages 623H2 have the following structure in more detail. When attention is paid to one among the two passages 623H2, its approximate shape is substantially rectangular parallelepiped as illustrated in FIG. 7 (refer to the thick dashed line in FIG. 7). As illustrated in FIG. 6, the top surfaces of the substantially rectangular parallelepiped passages 623H2 are constituted of the inner surface of the cover main body 623. The bottom surfaces of it in FIG. 6, which face the top surface, are constituted of the inner surface of the plate member 610. On the other hand, in FIG. 6, the right surface of the right passage 623H2 is constituted of the inner surfaces of the bent portions 613 of the plate member 610. The left surface that is opposite to the right surface is constituted of the right surface in FIG. 6 of the electro-optical device 500. In FIG. 6, the reverse to the relationship between the right and the left is established with respect to the left passage 623H2. That is, both surfaces of the electro-optical device 500 constitute the surfaces that constitute the passages 623.

Figure 10:
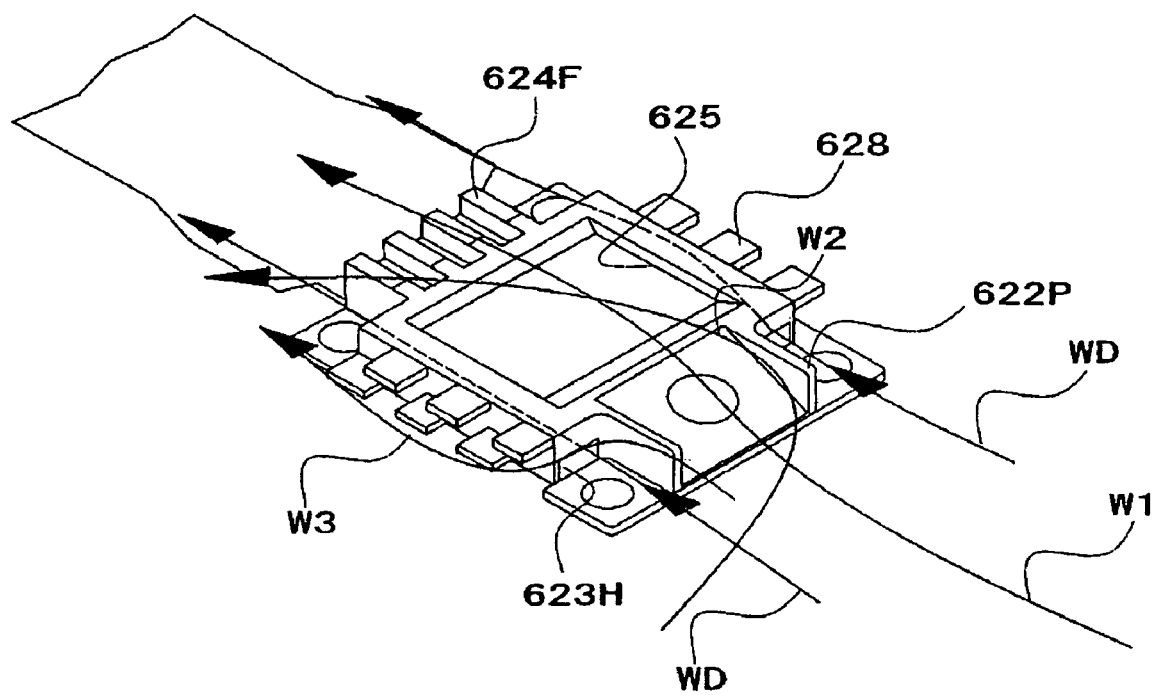
FIG. 10 is a perspective view of the electro-optical device encased in the mounting case and illustrates the typical blowing direction of wind with respect to the electro-optical device encased in the mounting case.
Figure 11:
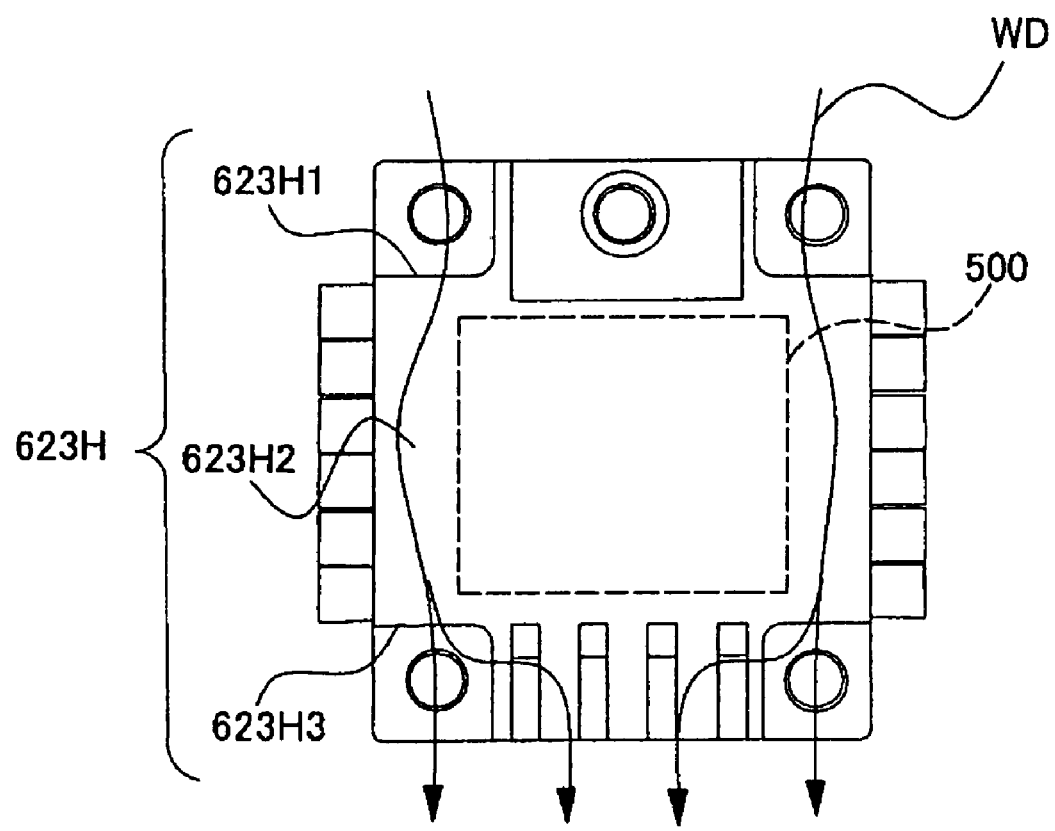
FIG. 11 is a view for describing the cooling air that blows through the cooling-air guiding portion with the same purpose as FIG. 5.

Since the cover member 620 has the aforementioned construction, the wind blown from the sirocco fan 1300 provided in the liquid crystal projector 1100, as showed in FIG. 1, blows, as shown in FIG. 10 and FIG. 11, into the mounting case 601 or the cover member 620. Here, FIG. 10 is a perspective view of an electro-optical device encased in the mounting case and illustrates the typical blowing direction of wind into the electro-optical device encased in the mounting case. FIG. 11 is a view for describing the cooling air that blows through the cooling-air guiding portion 623H with the same purpose as FIG. 5. In addition, in the liquid crystal projector 1100 shown in FIG. 1, in order to implement the blow of the cooling air as shown in FIG. 10 and FIG. 11, it is necessary to provide the electro-optical device encased in the mounting case, that is, light valves 100R, 100G, and 100B such that the outlets 100RW, 100GW, and 100BW described above with reference to FIG. 1 face the cooling-air introducing portion 622 constituting the cover member 620.

In the outside of the mounting case 601 according to this embodiment, the air current wind, such as cooling winds W1, W2, and W3 illustrated in FIG. 10, is realized. Therefore, the electro-optical device 500 is effectively cooled. This is because the cooling air passes through the cover main body 623 (refer to reference numeral W1) as if it jumps over the tapered portion 622T of the cooling-air introducing portion 622 and because almost of the cooling air can be induced to the tapered portion 622T, furthermore, to the cover main body 623 (refer to reference numeral W2) independent of the direction of the cooling air, by providing the baffle plate 622P in the cooling-air introducing portion 622. The cooling air W1 and W2 deprives the surface of the electro-optical device 500 (that is, the surface of the electro-optical device 500 corresponding to the image display region 10a) exposed through the window 625 of the heat. As mentioned above, according to the embodiment, since it is possible to effectively send the cooling air toward the cover main body 623, it is possible to directly deprive the electro-optical device 500 of the heat generated by the electro-optical device 500 (that is, to cool the electro-optical device 500).

On the other hand, according to the present embodiment, it is possible to effectively cool the cover main body 623 and the cover member 620. This is because the air (refer to the reference numeral W3) that reaches the external surface (that is, the surface that does not face the tapered portion 622T) of the baffle plate 622P of the cooling-air introducing portion 622 or the wind that reaches the surface of the electro-optical device 500 and around the electro-optical device 500 and blows along the side surface of the cover main body 623 as mentioned above reaches the side fin portion 628 that increases the area of the cover member 620 or the cooling airs W1 and W2 reach the rear fin portion 624F that increases the area of the cover member 620. That the cover member 620 is effectively cooled is effective for finally radiating to the outside the heat transmitted to the electro-optical device 500, the plate member 610, and the cover member 620 in this order as mentioned above or the heat transmitted from the electro-optical device 500 to the cover member 620 without passing through the plate member 610 to the outside. That the cover member 620 is effectively cooled means that the heat can be effectively transmitted to the plate member 610 or the cover member 620 from the electro-optical device 500 through the bent portions 613. That is, since the cover member 620 is usually appropriately cooled, the cover member 620 can keep the function of the heat sink to thus deprive the plate member 610, furthermore, the electro-optical device 500 of the heat.

According to the embodiment, in particular, since the cooling-air guiding portions 623H are provided in the cover main body 623, as illustrated in FIG. 10 or 11, it is possible to let the cooling air pass through the inside of the cover member 620 (refer to the reference numeral WD in the drawing). In other words, the cooling air WD that blows toward the cooling-air introducing portion 622 enters the cover main body 623 from the cooling air inlets 623H1, passes through the passage 623H2, and is exhausted from the cooling air outlets 623H3 to the outside of the cover main body 623. At this time, since a part of the surfaces that constitute the passage 623H2 includes both surfaces of the electro-optical device 500 as mentioned above (refer to FIG. 6), the cooling air WD directly cools the electro-optical device 500.

Furthermore, according to the embodiment, the two corresponding passages 623H2 are provided corresponding to the two cooling air inlets 623H1. Therefore, since it is possible to cool both surfaces of the electro-optical device 500, it is possible to obtain the above-mentioned effects.

Since the other part of the surfaces that constitute the passage 623H2 includes a part of the inner surfaces of the plate member 610 and the cover member 620, the cooling air WD cools the plate member 610 and the cover member 620. When the plate member 610 and the cover member 620 are cooled, they effectively function as the heat sinks of the electro-optical device 500. Therefore, it is possible to effectively cool the electro-optical device 500.

Furthermore, according to the embodiment, since the cooling-air guiding portions 623H include the cooling air inlets 623H1 and the cooling air outlets 623H2 on both surfaces of the cover main body 623, which face each other, the cooling air that cools the electro-optical device 500 or the cover member 620 and the plate member 610 rapidly blows from the cooling air outlets 623H2 to the outside of the mounting case 601. Also, fresh cooling air is always sent from the cooling air inlets 623H1. That is, since the cooling air can be actively circulated, it is possible to obtain the above-mentioned effects.

Therefore, as described above, according to this embodiment, since the heat is not excessively accumulated in the electro-optical device 500, the deterioration of the liquid crystal layers 50 and the generation of the hot spots can be prevented in advance. Thus, the deterioration of images can be greatly reduced.

It should be understood that the invention is not limited to the aforementioned embodiments, but it can be modified without departing from the scope and spirit of the invention obtained by the claims and the teachings of the specification and the accompanying drawings. The modified electro-optical device encased in the mounting cases, projection display apparatuses, and mounting cases also belong to the technical scope of the invention. It is possible to apply the invention to an electrophoreses device or an electroluminescent device in addition to the liquid crystal panel as the electro-optical device.

What is claimed is:

1. An electro-optical device encased in a mounting case obtained by accommodating in the mounting case an electro-optical device having an image display region on which projection light from a light source is incident, the mounting case comprising:
    a plate disposed so as to face one surface of the electro-optical device;
    a cover disposed so as to cover the plate and the electro-optical device; and
    cooling-air guiding portions each including at a portion of side surfaces of the electro-optical device as at least some of surfaces that constitute a cooling air passage.

2. The electro-optical device encased in the mounting case according to claim 1, at least some of the surfaces other than the surface including at least some of the side surfaces of the electro-optical device among the surfaces that constitute the cooling air passage comprising at least a part of an inner surface of at least one of the cover and the plate.

3. The electro-optical device according to claim 1,
    each of the cooling-air guiding portions including a first hole formed in one surface of the cover as an inlet of the cooling-air, and a second hole formed in a surface that faces the one surface of the cover as an outlet of the cooling air.

4. The electro-optical device according to claim 1, a plurality of the passages being provided, at least some of the surfaces that constitute one passage including at least some of the side surfaces of the electro-optical device; and at least some of the surfaces that constitute the other passages including at least some of the side surfaces opposite to the side surfaces of the electro-optical device.

5. The electro-optical device according to claim 1, the cover comprising:
    a cover main body having a window corresponding to the image display region; and
    a cooling-air introducing portion connected to the cover main body or extended from the cover main body, the cooling-air introducing portion transmitting cooling air to the surface of the electro-optical device exposed through the window,
    an inlet of the cooling-air guiding portion being formed in a portion of the cover main body where the cooling-air introducing portion is not provided.

6. The electro-optical device according to claim 1, the cover including a surface-area increasing device.

7. The electro-optical device according to claim 1, at least one of the cover and the plate contacts at least a part of the electro-optical device with each other.

8. A projection display apparatus, comprising:
    the electro-optical device encased in the mounting case according to claim 1;
    a light source;
    an optical system that guides projection light onto the electro-optical device;
    a projection optical system that projects the projection light emitted from the electro-optical device; and
    cooling-air transmitting device that transmits cooling air into the electro-optical device encased in the mounting case.

9. An electro-optical device encased in a mounting case obtained by accommodating in the mounting case an electro-optical device having an image display region on which projection light from a light source is incident, the mounting case comprising:
    a plate disposed so as to face one surface of the electro-optical device;
    a cover disposed so as to cover the plate and the electro-optical device; and
    cooling-air introducing inlets formed in side surfaces of the cover, the side surfaces of the cover being positioned above the cooling air transmitted into the electro-optical device encased in the mounting case.

10. A mounting case for accommodating an electro-optical device having an image display region on which projection light from a light source is incident, the mounting case comprising:
    a plate disposed so as to face one surface of the electro-optical device;
    a cover disposed so as to cover the plate and the electro-optical device; and
    cooling-air guiding portions each including at least some of side surfaces of the electro-optical device as at least some of surfaces that constitutes a cooling air passage.

* * * * *